(12) United States Patent
Negel et al.

(10) Patent No.: US 8,720,832 B2
(45) Date of Patent: May 13, 2014

(54) FASTENING ELEMENT FOR ELONGATED MATERIAL

(75) Inventors: Raimund Negel, Unterensingen (DE);
Arne Schmierer, Kirchheim (DE);
Andreas Herrmann, Winnenden-Baach (DE)

(73) Assignee: SMR Patents S.a.r.l., Luxembourg (LU)

( * ) Notice: Subject to any disclaimer, the term of this patent is extended or adjusted under 35 U.S.C. 154(b) by 48 days.

(21) Appl. No.: 13/171,975

(22) Filed: Jun. 29, 2011

(65) Prior Publication Data

US 2012/0001031 A1    Jan. 5, 2012

(30) Foreign Application Priority Data

Jul. 2, 2010   (EP) .................................... 10168254

(51) Int. Cl.
*F16B 15/00* (2006.01)
*F16B 45/00* (2006.01)

(52) U.S. Cl.
USPC ............................... 248/71; 248/73; 248/74.3

(58) Field of Classification Search
USPC ................. 248/49, 73, 74, 68.1, 71, 74.3
See application file for complete search history.

(56) References Cited

U.S. PATENT DOCUMENTS

| | | | |
|---|---|---|---|
| 4,779,828 A * | 10/1988 | Munch | 248/74.3 |
| 6,827,316 B1 | 12/2004 | Arai | |
| 7,757,997 B2 * | 7/2010 | Smutny et al. | 248/71 |
| 8,221,042 B2 * | 7/2012 | Vitali | 411/510 |
| 2005/0242247 A1 * | 11/2005 | Geiger | 248/74.3 |
| 2008/0217488 A1 | 9/2008 | Carretero | |

FOREIGN PATENT DOCUMENTS

| | | |
|---|---|---|
| DE | 9405363 | 8/1994 |
| DE | 9317983 | 12/1994 |
| DE | 202006010110 | 10/2006 |
| EP | 0571327 | 11/1993 |
| EP | 1286094 | 2/2003 |
| EP | 2106006 | 9/2009 |
| JP | 2007187238 A | 7/2007 |

OTHER PUBLICATIONS

European Search Report for application No. EP 10 16 8254 dated Dec. 2, 2010.
China Office Action dated Dec. 11, 2013; 6 pages.

* cited by examiner

*Primary Examiner* — Amy J Sterling
(74) *Attorney, Agent, or Firm* — Reising Ethington PC

(57) ABSTRACT

A fastening element for fastening elongated materials in a motor vehicle with an anchoring part, which engages in the wall, to which the fastening part is attached, is proposed. The anchoring part has two spreading arms and a seal which circularly surrounds the anchoring part.

4 Claims, 2 Drawing Sheets

FASTENING ELEMENT FOR ELONGATED MATERIAL

The invention is based on a priority patent application EP 10168254.0 which is hereby incorporated by reference.

BACKGROUND ART

1. Field of the Invention

The present invention relates to a fastening element for elongated materials such as cables and/or supply lines.

Cable harnesses and cable connections are used in large quantities in the automotive industry. Clips, which often comprise cable ties, which cannot be used again after a single use, serve for laying these cables, lines and cable pulls and for fixing.

2. Description of the Related Art

A clip is known in DE 93 17 983 U, with a fastening clamp made of plastic, which serves to hold cable harnesses, to integrally connect an anchoring part, which serves to attach the fastening clamp and thus also the cable harness to a component. The anchoring part is equipped with spreading members, for example, with which it is anchored in or behind an opening. It can only be released from the anchoring position in a non-destructive way, if the parts effecting the anchoring are released from the rear side of the component. However, the space behind the fastening clamp is often inaccessible. If the fastening element must be removed, for example, after damage, in order to make way for a new fastening element, it must be destroyed.

An exemplary cable clip with a clamp band is known in EP0571327 B1. The cable clip has a clamp band, which is connected to a body via an eyelet. When used in a vehicle, a cable clip of this type with a clamp band has the disadvantage, that no sealing function is available at the point where the anchoring part is pressed into wall. However, in the case of vehicles, it is very important to seal openings which open to the outside. Therefore, the object of the invention is to provide a cable clip, which has variable fastening options for elongated materials, such as cables, cable pulls and lines, and also carries out a sealing function.

The fastening clip according to the invention is tasked with holding the cable securely, whilst being easy to install and being easily connectable to the cable.

SUMMARY OF THE INVENTION

A fastening element for fastening elongated materials in a motor vehicle with an anchoring part, which engages in the wall, to which the fastening part is attached, is proposed. The anchoring part has two spreading arms and a seal which circularly surrounds the anchoring part.

BRIEF DESCRIPTION OF THE DRAWINGS

Advantages of the invention will be readily appreciated as the same becomes better understood by reference to the following detailed description when considered in connection with the accompanying drawings, wherein.

The invention is subsequently explained in more detail with reference to the drawings, which illustrate a preferred embodiment. In the drawings.

DETAILED DESCRIPTION OF THE PREFERRED EMBODIMENT

Figure 1:
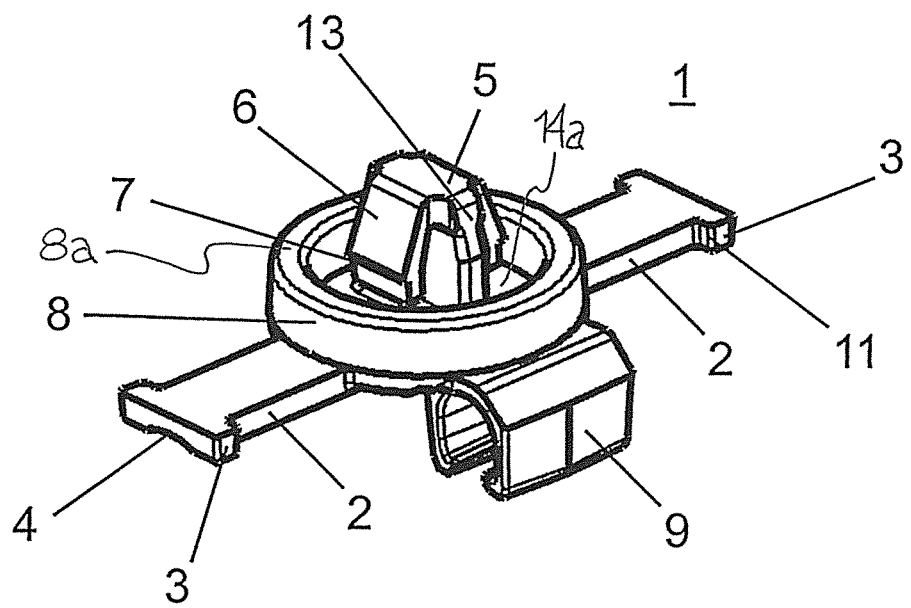
FIG. 1 shows a cable clip according to the invention.

The fastening element 1 according to the invention comprises at least one bar 2. The bars 2, as shown in FIG. 1, extend in a straight line away from an anchoring part 5, which is connected to a base plate 14. In alternative embodiments, the bars are designed as one piece or as two components, which originate separately from the base plate. The bars serve for fastening the elongated materials, such as cables or lines, which are guided along the longitudinal axes of the bars. The bars comprise protrusions 3 at their ends, which widen the bar at the end. The protrusions comprise a rib structure 11 on the inside. The anchoring part 5 has two spreading arms 6, which taper off into anchoring elements 7. In the embodiment in FIG. 1, the anchoring part 5 has a plane front surface and bevelled side surfaces 13. The body of the anchoring part 5 is surrounded by a circular sealing ring 8, which extends out from an under surface 14a of the base plate 14. The sealing ring 8 is an integral component of the cable clip and is formed directly with the cable clip in a 2-K injection technique. This 2-K technique is the preferred embodiment. The same functionality can be achieved, however, by the seal being produced as a separate part and being secured to the under surface 14a of the base plate 14. The cable clip 1 also comprises a support 9. The support 9 is designed as a hollow cylinder with an opening along the long cylinder axis. The support 9 is arranged parallel to the bars 2 on the base plate of the cable clip. The support 9 has a cylindrical, elongated structure, which comprises an opening for introducing a cable. The opening does not have to be in the position shown above in FIG. 3. In another embodiment, the opening can also be arranged on the side or nearly on the opposite side of the hollow cylinder. The arms 9a formed due to the opening have protrusions 9b which are curved inwards. The elongated material to be mounted is therefore more securely fixed.

Figure 2:
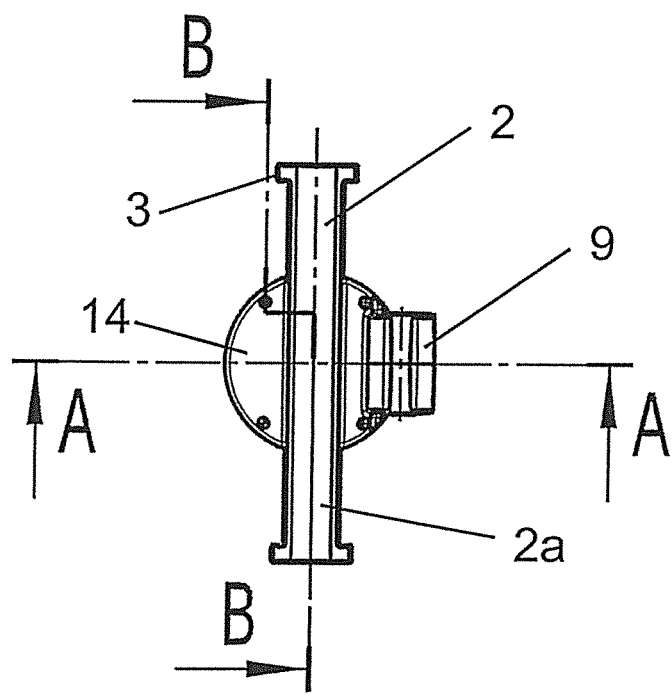
FIG. 2 shows a top view of a cable clip according to the invention.

FIG. 2 shows an overview of the cable clip from below. The bars 2, which extend away from the base plate 14, can be seen. In this embodiment, the bars are connected to a component. The bars extend into protrusions 3. The support 9, which is situated on the right side of the base plate, can be seen.

In another embodiment, a second support 9 is also arranged on the other side of the base plate.

Figure 3:
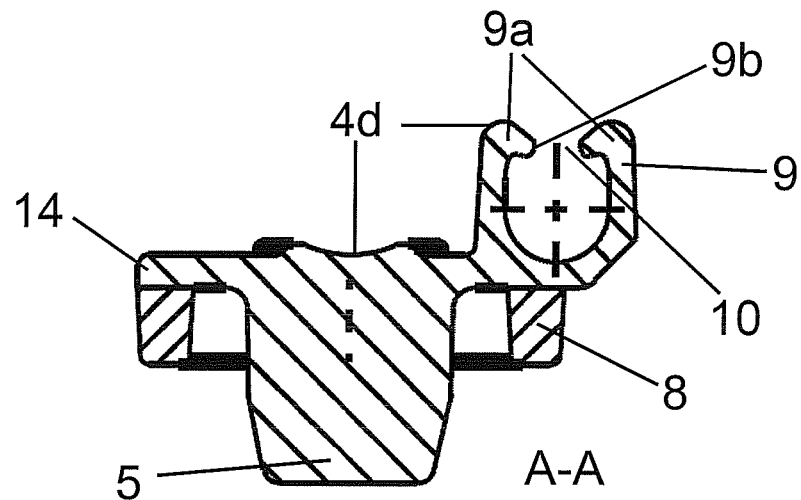
FIG. 3 is a cross-section through the intersecting line A-A.

In the intersection A-A, FIG. 3 shows the options for fastening elongated materials in an embodiment, which has a support 9. The main fastening for cable or lines takes place along the bars 2. In the process, the material to be fastened is led along the bars, and rests on the minor radius 4 of the base plate 14 and the bars 2 of the cable clip. In the process, the radius 4 is adapted to the nominal radius of the material to be installed. The elongated material has a set direction due to the guide along the bars, and also cannot bend along the guide. This is important even in hollow lines. The diameter of the material to be installed is limited by the distance D of the centre of the cross-section of the material to be installed from the outer wall of the support 9.

Figure 4:
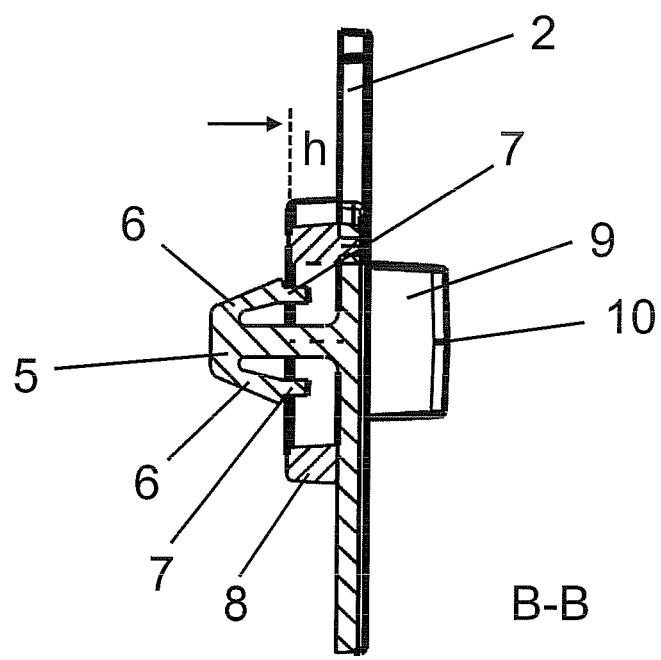
FIG. 4 is a cross-section through the intersecting line B-B.

FIG. 4 shows a longitudinal section through the axis B-B. The structure of the anchoring part 5 can be seen in this section. The anchoring part has two spreading arms 6, which lead into anchoring elements 7. The sealing ring 8 can be seen in the section, whose outer ring edge 8a extends to a height h, selected so that the locking elements 7 lie inside of the volume formed by the ring with the height h. In other words, the locking elements 7 extend to a position closer than the outer ring edge 8a to the under surface 14a of the base plate 14. The height of the sealing ring is selected so that the desired sealing effect is guaranteed after assembly and locking of the cable clip. The design of the spreading arms is only as an example here; several spreading arms or a structure with a mushroom head shape can also be used.

It is important that the locking elements lie inside the volume of the seal 8, in order to guarantee the sealing function. This volume is limited by the circular base surface and the height h of the seal. The cable clip is produced in two-component injection moulding. The designs are only limited by the formability of an injection mould. ASA or ABS or PMMA are used as material for the clip, and a thermoplastic elastomer is used for the seal.

The cable clip according to the invention is pressed into an opening in the vehicle for installing the elongated material. This can concern any component in the vehicle, which has a border between the wet outdoor area and the dry indoor area.

A car door panel is chosen as an example.

In a first step, the elongated material is led along the bar 2. The elongated material is fastened to the bar, fixed in at least one position, by a cable tie or a band. In this process, the protrusions 3 as well as the ridges 11 serve to guide the cable tie to be applied and to protect it against slipping.

After assembly of the first elongated material, alternatively, further cables can be installed in the support provided, or the cable clip is immediately fixed on the wall provided.

In the process, the anchoring part is guided by its conically tapering form, which is formed by the two spreading arms, and is locked into place in the opening of the vehicle by means of the locking elements 7. Since the locking elements 7 are situated inside of the volume of the sealing ring 8, the sealing ring 8 is thus pressed against the wall of the vehicle, and closes the opening, into which the anchoring element is introduced, in a watertight way. After the cable clip is connected to the wall of the vehicle, and is already serving as a fastening and a guide for a cable or a lines, further cables or lines are positioned in the support 9.

In a further expansion stage, a cable clip with further support structures is possible, in which more elongated materials such as cables and lines can be installed. The advantage of this is that after installation of the cable clip in a vehicle wall, the opening is situated on the side which is accessible for further installations.

Alternatively, the cable clip can be inserted into the vehicle wall with all of the elongated materials already pre-installed.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A fastening element for fastening elongated materials in a motor vehicle, said fastening element comprising:
   an anchoring part engagable with a wall to which said fastening element is attached, said anchoring part including a base plate having an under surface and spreading arms extending out to free ends, each of said free ends including an anchoring element
   a seal defining an outer ring edge having a height and extending around said anchoring part, said seal being molded to said base plate as a 2-K component, whereby all of said anchoring elements of said free ends are positioned closer than said outer ring edge to said under surface such that said seal positively abuts the wall before said all of said anchoring elements engage the wall ensuring said seal seals the wall when said said anchoring elements engage the wall;
   at least one bar extending along the elongated material, said at least one bar including a contact surface for a cable tie, wherein said at least one bar defines a radius on its front face, which radius corresponds to a radius of the elongated material to be installed; and
   at least one support for a second elongated material.

2. Fastening element according to claim 1, wherein the support is designed as a cylinder with an opening along the cylinder longitudinal axis, whereby protrusions are attached for fixing the elongated material.

3. A fastening element for fastening elongated materials in a motor vehicle, said fastening element comprising: an anchoring part engagable with a wall to which said fastening element is attached, said anchoring part including a base plate and spreading arms extending out to free ends, each of said free ends including an anchoring element; and a seal being molded to said base plate as a 2-K component and defining an outer ring edge having a height and extending around said anchoring part, said seal defining a volume between said base plate and said outer ring edge whereby all of said anchoring elements are positioned within said volume such that said seal positively abuts the wall before said anchoring elements engage the wall ensuring said seal seals the wall when said anchoring elements engage the wall;
   at least one bar extending along the elongated material, said at least one bar including a contact surface for a cable tie, wherein said at least one bar defines a radius on its front face, which radius corresponds to a radius of the elongated material to be installed; and
   at least one support for a second elongated material.

4. A fastening element for fastening elongated materials in a motor vehicle, said fastening element comprising: an anchoring part engagable with a wall to which said fastening element is attached, said anchoring part including a base plate and spreading arms extending out to free ends, each of said free ends including an anchoring element; and a seal being molded to said base plate as a 2-K component and defining an outer ring edge having a height and extending around said anchoring part, said seal defining a volume between said base plate and said outer ring edge whereby all of said anchoring elements are positioned within said volume and closer than said outer ring edge to said under surface such that said seal positively abuts the wall before said anchoring elements engage the wall ensuring said seal seals the wall when all said anchoring elements engage the wall;
   at least one bar extending along the elongated material, said at least one bar including a contact surface for a cable tie, wherein said at least one bar defines a radius on its front face, which radius corresponds to a radius of the elongated material to be installed; and
   at least one support for a second elongated material.

* * * * *